US012806556B2

(12) United States Patent
Vlacic

(10) Patent No.: US 12,806,556 B2
(45) Date of Patent: Nov. 24, 2026

(54) SYSTEM FOR SCRUBBING EXHAUST EMISSIONS

(71) Applicant: Matija Vlacic, Kitchener (CA)

(72) Inventor: Matija Vlacic, Kitchener (CA)

( * ) Notice: Subject to any disclaimer, the term of this patent is extended or adjusted under 35 U.S.C. 154(b) by 345 days.

(21) Appl. No.: 18/543,437

(22) Filed: Dec. 18, 2023

(65) Prior Publication Data

US 2025/0196046 A1 Jun. 19, 2025

Related U.S. Application Data

(60) Provisional application No. 63/485,779, filed on Feb. 17, 2023.

(51) Int. Cl.

| | |
|---|---|
| ***B01D 47/06*** | (2006.01) |
| ***B01D 47/02*** | (2006.01) |
| ***B01D 47/10*** | (2006.01) |
| ***B01D 47/12*** | (2006.01) |
| ***B01D 53/14*** | (2006.01) |
| ***F01N 13/00*** | (2010.01) |
| *F01N 3/08* | (2006.01) |

(52) U.S. Cl.

CPC ............. *B01D 47/06* (2013.01); *B01D 47/02* (2013.01); *B01D 47/10* (2013.01); *B01D 47/12* (2013.01); *B01D 53/14* (2013.01); *F01N 13/00* (2013.01); *F01N 3/08* (2013.01)

(58) Field of Classification Search

CPC ........ B01D 47/06; B01D 47/12; B01D 53/14; B01D 47/10; B01D 47/02; F01N 13/00; F01N 3/08; B05B 1/34

USPC .............................................................. 95/92

See application file for complete search history.

(56) References Cited

U.S. PATENT DOCUMENTS 4,818,256 A * 4/1989 Ross ...................... B01D 50/00 95/216

2016/0016109 A1* 1/2016 Strandberg ............... F23J 15/04 95/218

FOREIGN PATENT DOCUMENTS

CN 202590554 U * 12/2012

KR 20210023217 A * 3/2021 ............. B01D 53/14

* cited by examiner

*Primary Examiner* — Christopher P Jones
*Assistant Examiner* — Miriam N Ezeluomba
(74) *Attorney, Agent, or Firm* — Own Innovation Inc.; James W. Hinton; Sanjeevan Shivakumar

(57) ABSTRACT

A system for scrubbing chemicals and particulate matter from exhaust emissions using steam and water is provided. The system includes an exhaust pipe having an inlet and an outlet. The exhaust pipe is inclined by at least 2 degrees with respect to horizontal. Water and steam supply lines run parallel to the exhaust pipe and connect to a plurality of water and steam nozzles to inject water/steam into the exhaust pipe cocurrent to the direction of emissions flow. The nozzles are positioned along the length, and around the circumference, of the exhaust pipe to inject water/steam into the exhaust pipe from multiple directions to saturate at least a cross sectional area of the interior volume of the exhaust pipe with water/steam. Absorbed chemicals and particulate matter collect as wastewater at bottom of the exhaust pipe and drain by gravity into a reservoir positioned below the outlet.

20 Claims, 4 Drawing Sheets

SYSTEM FOR SCRUBBING EXHAUST EMISSIONS

TECHNICAL FIELD

The embodiments disclosed herein relate to filtering and treatment of exhaust emissions/waste gases, and, in particular to a system for scrubbing dust, microparticles, and chemicals from exhaust emissions/waste gases.

INTRODUCTION

Pollution from exhaust gas emissions is one of the biggest problems on the planet. Power stations, factories and other industrial plants are continuously emitting exhaust waste gases polluting the atmosphere, soil and water. Even residential sources and commercial operations, such as restaurants, emit exhaust gas emissions from cooking, especially when using wood or charcoal as fuel. This is damaging to the environment and contributes to climate change.

Treatment and filtering of exhaust emissions typically involves chemical conversion of more harmful emissions into less harmful products (e.g., catalytic converters) or physical separation of harmful particulates from exhaust air (e.g., particulate, HEPA filters).

Scrubbing is another method by which harmful gasses and/or particulate matter in exhaust emissions are filtered out. Scrubbing generally involves passing the exhaust emissions through a wet or dry absorbent that retains the harmful chemical(s) and or particulate matter. A difficulty is that wet scrubber designs generally require high pressure nozzles, or other means, to atomize water to effectively trap particulate within water droplets. The emissions flow through rate of the scrubber must also be tightly controlled to ensure there is effective capture of the target emissions while ensuring no overpressure which could result in the steam/water droplets containing chemicals/particulate matter to be released into the environment with the filtered exhaust. Atomizing water and regulating the flow through rate of emissions typically requires complex control components which draw power, must be regularly maintained to ensure optimal capture of emissions and are costly to implement.

Accordingly, there is a need for a new scrubber system having few components/materials, low energy consumption, low-maintenance and ease of installation to address the limitations of existing systems.

SUMMARY

A system for scrubbing exhaust emissions is described. The system provides a simple, low-cost, low maintenance means to scrub harmful chemicals and particulate matter from emissions using water and steam. The system can be installed at existing emission sources such as power plants, industrial plants, factories and restaurants.

The system includes a scrubber section comprising an exhaust pipe having an inlet and an outlet. The inlet is in fluidic connection with an emissions source and the outlet is in fluidic connection with a reservoir and a chimney. The inlet is raised with respect to the outlet such that the exhaust pipe is inclined by at least 2 degrees with respect to horizontal to allow wastewater to drain to the outlet by gravity.

The system includes a plurality of water and steam supply lines running parallel to the exhaust pipe, each supply line connecting to a plurality of nozzles for injecting water or steam into the exhaust pipe at least partially cocurrent to the emissions flow.

Each nozzle is configured to spray a conical stream of water or steam in an arc of at least 72 degrees. According to various embodiments, the nozzles are positioned along the length, and around the circumference, of the exhaust pipe to inject water/steam into the exhaust pipe from multiple directions to saturate at least a cross sectional area of the interior volume of the exhaust pipe with water/steam. Generally, a subset of the water nozzles is positioned downstream of each steam nozzle to condense the steam (and absorbed chemicals, particulates) into wastewater. A section of the exhaust pipe proximate to the outlet contains only water nozzles, without any steam nozzles, to ensure complete condensation of steam injected into the exhaust pipe.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
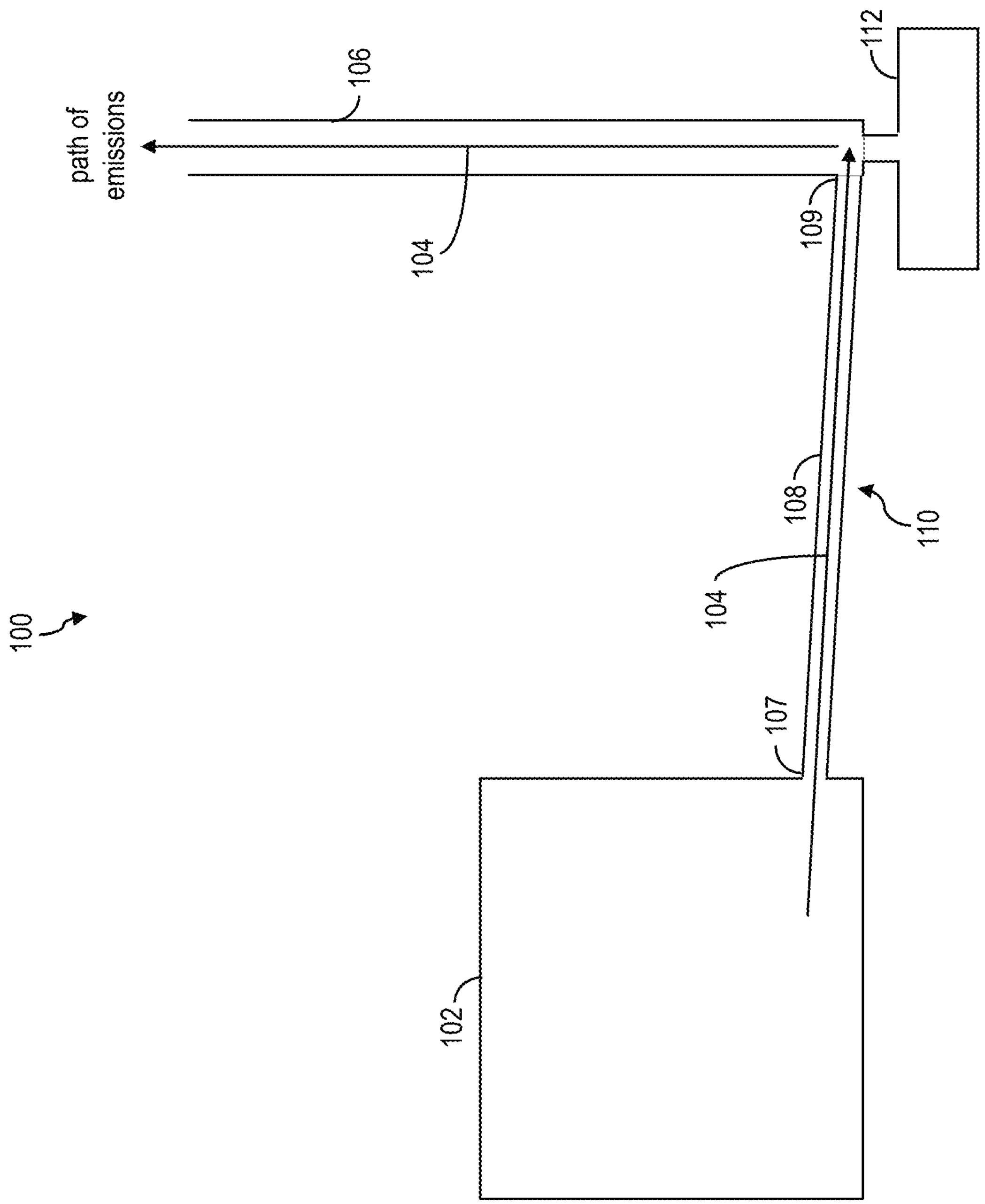
FIG. 1 is a diagram of a scrubber system, according to an embodiment.

Referring to FIG. 1, shown therein is a diagram of a scrubber system 100, according to an embodiment. The system 100 includes an emission source 102. The emission source 102 generates exhaust gas emissions 104 including chemicals (e.g., sulfur dioxide, ammonia, carbon dioxide, carbon monoxide, nitrates, nitrites, etc.) and/or particulate matter (e.g., soot, dust) and/or odor. The emission source 102 may be a power plant, an industrial plant, a factory, a restaurant, a residential source, etc.

The system 100 includes an exhaust pipe 108 connecting the emission source 102 to an outlet/chimney 106 through which the emissions 104 are released into the environment. The exhaust pipe 108 includes an inlet 107 in fluidic connection with the emission source 102 and an outlet 109 in fluidic connection with the chimney 106. The chimney 106 may include fans, blowers, or the like, to aid in drawing the emissions 104 through the chimney 106.

The exhaust pipe 108 is preferably constructed of stainless steel to inhibit rust. The pipe 108 includes plurality of water and steam nozzles (see FIGS. 2-4) for injecting water and steam into the pipe 108. The water and steam acts as absorbents that retains chemical gases, odors and particulate matter in the emissions 104. The water and steam are injected into the exhaust pipe 108 at all times the emission source 102 is operational and generating emissions 104.

Existing scrubber systems typically have a vertical arrangement, with emissions flowing upward or downward between the inlet and outlet. By contrast, a scrubber section 110 of the exhaust pipe 108 is substantially horizontal with a slight incline. The inlet 107 is positioned higher with respect to the outlet 109 such that the scrubber section 110 (and the exhaust pipe 108) is inclined by at least 2-degrees with respect to horizontal. The incline allows wastewater (including condensed steam) to fall to the bottom of the pipe 108 and drain by gravity toward the outlet 109. While the scrubber section 110 is shown as straight, according to other embodiments the scrubber section 110 (and the pipe 108) may be a bent or curved path having a 2 degree incline. According to some embodiments, the scrubber section 110 may be within the emission source 102 itself.

The system 100 includes a reservoir 112 in fluidic connection with the outlet 109 for collecting wastewater as it drains through the outlet 109.

Figure 2:
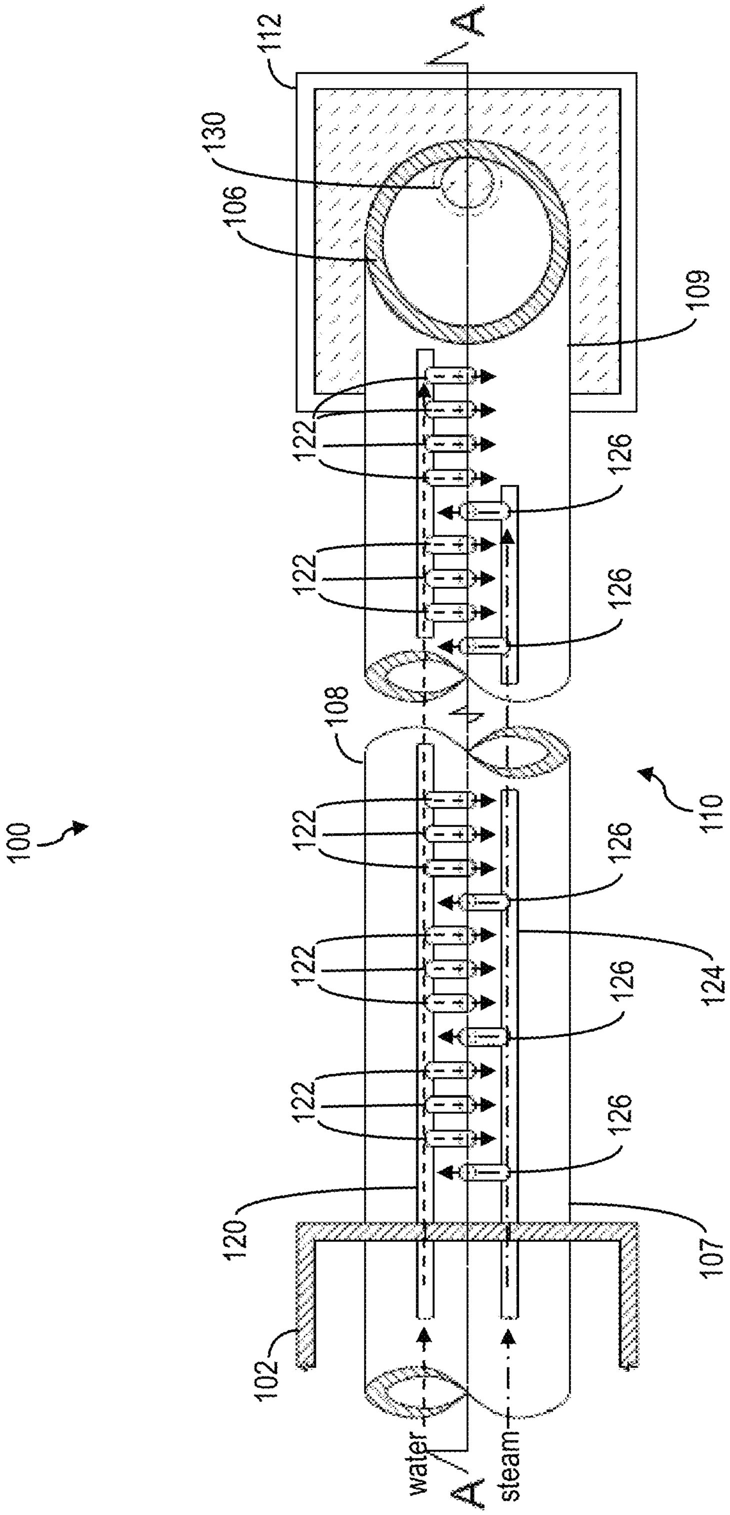
FIG. 2 is a top view of the scrubber system shown in FIG. 1.
Figure 3:
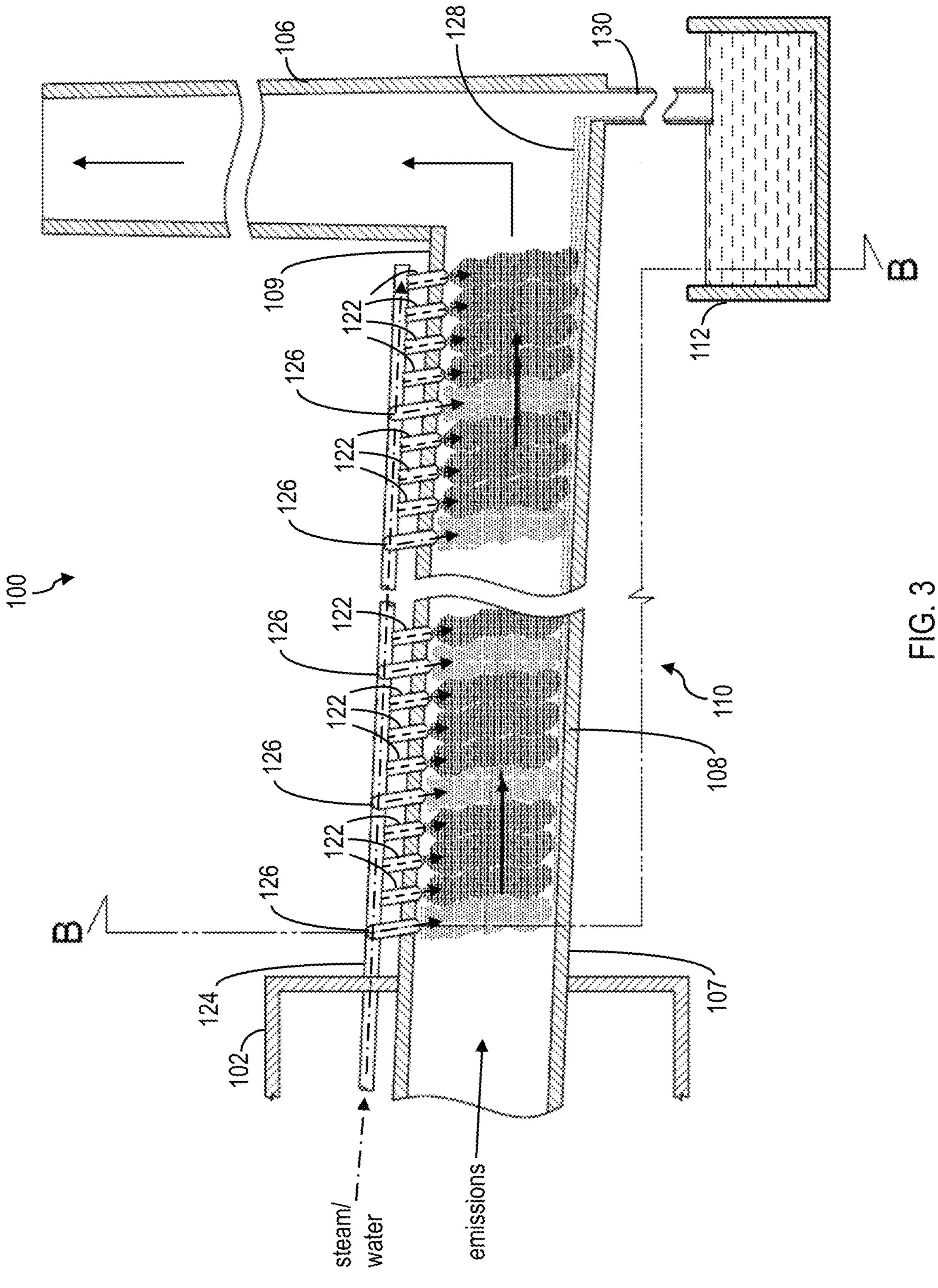
FIG. 3 is a side cross-sectional view through section A-A of the scrubber system shown in FIG. 2.

Referring to FIGS. 2 and 3 shown therein are top and side cross-sectional views, respectively, of the scrubber system 100. The system 100 includes water supply lines 120 and steam supply lines 124 running in parallel to the exhaust pipe 108. Each supply line 120, 124 is disposed on the exterior of the exhaust pipe 108. Each supply line 120, 124 is connected to a plurality of nozzles 122, 126 for injecting water and steam, respectively, into the exhaust pipe 108. The water supply lines 120 and the steam supply lines 124 are connected to separate water and steam sources (not shown). The water source may be a municipal water supply. The steam source may be a pressurized boiler, or the like.

The water supply lines 120 and the steam supply lines 124 are generally arranged around the circumference of the exhaust pipe 108 in pairs running exterior to the exhaust pipe 108. The nozzles 122, 126 connecting to a respective pair of water and steam supply lines 120, 124, are disposed such that the nozzle openings on the interior of the exhaust pipe 108 lie in a line (e.g., line A-A). For ease of illustration, only one water supply pipe 120 and one steam supply line 124 are shown. Other embodiments may include 2 or more pairs of water supply lines 120 and the steam supply lines 124 connecting to 2 or more lines of nozzles spaced at equal increments around the circumference of the exhaust pipe 108.

Positioning the pairs of water and steam supply lines 120, 124 around the circumference of the exhaust pipe 108, may advantageously provide for water and steam to be injected into the exhaust pipe 108 from multiple directions to ensure saturation of at least a cross-sectional area of the exhaust pipe 108 interior volume with water and/or steam. Generally, the pairs of water and stream supply lines 120, 124 are spaced symmetrically, or at equal increments, around the circumference of the exhaust pipe 108, however, other arrangements are possible. In one embodiment shown in FIG. 4, 5 pairs of water supply lines 120 and steam supply lines 124 are arranged symmetrically around the circumference of the exhaust pipe 108 and connected to lines of nozzles 122, 126 spaced at 72-degree increments around the circumference of the exhaust pipe 108.

The water and steam supply lines 120,124 carry pressurized water and steam, respectively. The pressure of the water or steam in the supply lines 120, 124 is between 80 and 126 PSI. This water pressure is consistent with municipal water supply pressure, abrogating the need for a separate pump or compressor to pump the water through the water supply line 120. This pressure is also sufficient to cause water passing through the water nozzles 122 to atomize into droplet sizes that can absorb microparticles in the emissions.

The steam is injected to further absorb microparticles and harmful chemical gases (e.g., hydrogen sulfide and ammonia) in the emissions. The injected water also causes the steam (including absorbed particles) to condense into wastewater. Thus, the combination of water and steam may provide for simultaneous absorption of chemical gasses and solid particulates from the emissions.

According to some embodiments, scrubbing additives are added to the water supply neutralize (oxidize or reduce) certain chemical gases. Such additives include, but are not limited to, NaOH and CaCO3. Generally, the additive(s) selected will depend on the type of emissions generated by the emission source 120. The additives may be added into the water supply line 120 upstream of the nozzles 122, or added to the water source itself.

Each of the water and steam supply lines 120, 124 are fluidically connected to a plurality of nozzles 122, 126 for injecting water and steam, respectively, into the exhaust pipe 108. The nozzles 122, 126 are configured to inject the water and steam in a direction, or a conical arc, at least partially cocurrent to the direction of emissions flow to not substantially restrict the emission flow rate and increase gas pressure in the exhaust pipe 108.

The length of scrubber section 110, and the number of water nozzles 122 and steam nozzles 126 therein, may be varied depending on the composition and concentration of the emissions and the degree of scrubbing that is required to effectively remove the harmful chemicals and particulates from the emissions. Generally, there are more steam nozzles 126 disposed closer to the inlet 107 and more water nozzles 122 disposed closer to the outlet 109.

At least one water nozzle 122 is disposed downstream of each steam nozzle 126 in the scrubber section 110 to condense the steam and absorbed chemicals into liquid wastewater. In the embodiment shown, there are 3 water nozzles 122 downstream of each steam nozzle 126 in the scrubber section 110. According to other embodiments the ratio of water nozzles 122 to steam nozzle 126 may be different. According to a preferred embodiment, the ratio of water nozzles 122 to steam nozzles 126 in the scrubber section 110 is 1:1. According to an embodiment, the nozzles 122, 126 are disposed at 0.5 m increments along the length of the scrubber section 110.

A condensing section of the exhaust pipe 108 proximate to the outlet 109 includes only water nozzles 122, without any intervening stream nozzles, to ensure complete condensation of steam exiting the scrubber section 110 without allowing steam containing absorbed chemicals to exit the scrubber section 110 into the chimney 106. According to an embodiment, there are at least 10 water nozzles 122, without any intervening steam nozzles, covering the condensing section of the exhaust pipe 108 proximate to the outlet 109.

Wastewater 128 (i.e., water containing absorbed particulate matter and condensed steam containing absorbed chemicals) falls to the bottom of the exhaust pipe 108 and flows to the outlet 109 by gravity due to the incline of the scrubber section 110. The wastewater 128 flows into a drainpipe 130, in fluidic connection with the outlet 109, and is collected in a reservoir 112. The reservoir 112 is preferably underground, or at least below the outlet 109, to allow the wastewater 128 to flow into the reservoir by gravity. This arrangement abrogates the need for compressors or pumps to drain the wastewater 128.

According to some embodiments (not shown), the wastewater 128 in the reservoir may be filtered and recycled back to at least a subset of the water supply lines 122 for reinjection into the exhaust pipe 108.

Figure 4:
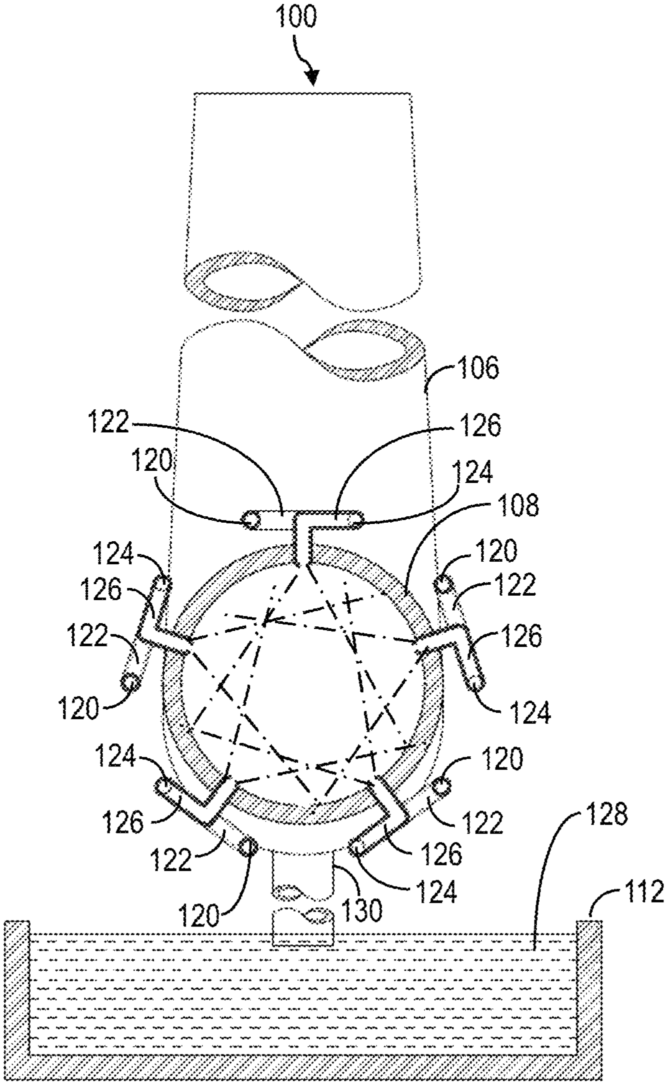
FIG. 4 is an end cross-sectional view through section B-B of the scrubber system shown in FIG. 3.

Referring to FIG. 4, shown therein is an end cross-sectional view through section B-B of the scrubber system 100 shown in FIG. 3. Each nozzle 122, 126 is configured to inject a conical stream/mist of water or steam having an arc of at least 72 degrees. As noted above, the nozzles 122, 126 (and the supply lines 120, 124), may be arranged at increments around the circumference of the exhaust pipe 108, to inject water and steam into the exhaust pipe 108 from multiple directions allowing for the water and steam to saturate a cross-sectional area of the exhaust pipe 108 interior volume with water and/or steam.

While the above description provides examples of one or more apparatus, methods, or systems, it will be appreciated that other apparatus, methods, or systems may be within the scope of the claims as interpreted by one of skill in the art.

The invention claimed is:

1. A scrubber system, comprising:

a substantially horizontal exhaust pipe having an inlet and an outlet, the inlet being higher than the outlet such that the exhaust pipe is inclined by at least 2 degrees with respect to horizontal, wherein an emissions flow through the exhaust pipe passes from the inlet through to the outlet;

at least a first water supply line and at least a first steam supply line running exterior to the exhaust pipe;

a scrubber section of the exhaust pipe comprising:

a first plurality of water nozzles in fluidic connection with the first water supply line, for spraying water into the exhaust pipe in a first direction; and a first plurality of steam nozzles in fluidic connection with the first steam supply line, for spraying steam into the exhaust pipe in the first direction, wherein water and condensed steam in the exhaust pipe drain by gravity to the outlet.

2. The scrubber system of claim 1, further comprising an emission source in fluidic connection with the inlet.

3. The scrubber system of claim 1, further comprising a chimney in fluidic connection with the outlet.

4. The scrubber system of claim 1, wherein the first direction is partially cocurrent to the emissions flow through the exhaust pipe.

5. The scrubber system of claim 1, further comprising:

at least a second water supply line and at least a second steam supply line running exterior to the exhaust pipe;

at least a second plurality of water nozzles in fluidic connection with the at least second water supply line, for spraying water into the exhaust pipe in at least a second direction; and at least a second plurality of steam nozzles in fluidic connection with the at least second steam supply line, for spraying steam into the exhaust pipe in at least the second direction, wherein the first direction and the at least second direction are partially cocurrent to the emissions flow through the exhaust pipe.

6. The scrubber system of claim 5, wherein the first water supply line, the first steam supply line, the at least second water line and the at least second steam supply line are spaced symmetrically around the circumference of the exhaust pipe.

7. The scrubber system of claim 5, wherein the first and the second pluralities of water nozzles and the first and the second pluralities of steam nozzles are arranged to saturate a cross-sectional area of an interior volume of the exhaust pipe with water and steam, respectively.

8. The scrubber system of claim 5, wherein the first plurality of water nozzles and the at least second plurality of water nozzles are disposed in lines spaced apart at equal increments in the circumference of the exhaust pipe, and the first plurality of steam nozzles and the at least second plurality of stream nozzles are disposed in the lines spaced apart at equal increments in the circumference of the exhaust pipe.

9. The scrubber system of claim 1, further comprising:

a drainpipe in fluidic connection with the outlet; and a reservoir for collecting wastewater from the drainpipe.

10. The scrubber system of claim 9, wherein the drainpipe and the reservoir are positioned below the outlet.

11. The scrubber system of claim 1, wherein the water nozzles and the steam nozzles are configured to spray water and steam, respectively, in a conical stream having an arc of at least 72 degrees.

12. The scrubber system of claim 1, wherein water pressure in the water supply line and steam pressure in the steam supply line is between 80-126 PSI.

13. The scrubber system of claim 1, wherein one or more of the first plurality of water nozzles is positioned downstream of each steam nozzle.

14. The scrubber system of claim 1, wherein a ratio of the water nozzles to the steam nozzles in the scrubber section is 1:1.

15. The scrubber system of claim 1, wherein the water nozzles and the steam nozzles are disposed at 0.5 m increments along the length of the scrubber section.

16. The scrubber system of claim 1, further comprising a condensing section of the exhaust pipe proximate to the outlet, the condensing section comprising a subset of the water nozzles without any steam nozzles.

17. The scrubber system of claim 3, wherein the chimney includes fans or blowers configured to draw emissions through the chimney.

18. The scrubber system of claim 2, wherein the scrubber section is within the emission source.

19. The scrubber system of claim 10, wherein the reservoir is underground.

20. The scrubber system of claim 1, wherein the scrubber section includes a bent or curved path.

* * * * *